United States Patent [19]
Eggert

[11] 4,069,079
[45] Jan. 17, 1978

[54] METHOD AND APPARATUS FOR PRODUCING ACCUMULATOR PLATE SEPARATOR POCKETS
[75] Inventor: Frank Eggert, Hamburg, Germany
[73] Assignee: Schlegel GmbH, Hamburg, Germany
[21] Appl. No.: 714,510
[22] Filed: Aug. 16, 1976
[30] Foreign Application Priority Data
Aug. 27, 1975 Germany .............................. 2538122
[51] Int. Cl.² ............................................. B29C 17/04
[52] U.S. Cl. ..................................... 156/212; 156/216; 156/227; 156/479; 156/484
[58] Field of Search ........................ 429/138, 136, 139; 156/109, 211, 212, 214, 216, 227, 257, 475, 483, 484, 517, 556, 580, 226, 443, 479; 53/196, 207, 208, 228; 428/45, 68, 192

[56] References Cited
U.S. PATENT DOCUMENTS

| 2,047,179 | 7/1936 | De Martis et al. | 429/139 |
| 3,201,280 | 8/1965 | Yumoto | 429/138 X |
| 3,576,695 | 4/1971 | Stine | 156/517 |
| 3,892,620 | 7/1975 | Heussy | 156/510 |

FOREIGN PATENT DOCUMENTS

| 2,332,546 | 1/1975 | Germany | 429/139 |

Primary Examiner—David A. Simmons
Attorney, Agent, or Firm—Cumpston & Shaw

[57] ABSTRACT

Apparatus for producing accumulator plate separator pockets, each of which is in the form of two rectangular porous film joined along three edges by a U-shaped edge strip, comprises a rectangular insertion plate, on opposite faces of which the two films are held. The plate is slidable, from a rest position, between two stops which are spaced apart by a distance slightly greater than the width of the plate. An edge strip is positioned across the two stops with the opening of the U facing towards the insertion plate, which is then slid forward to insert one edge into the U of the strip. Further forward movement of the plate causes the edge strip to bend around and engage the two side edges of the plate. The edge strip is then secured to the edges of the films.

6 Claims, 4 Drawing Figures

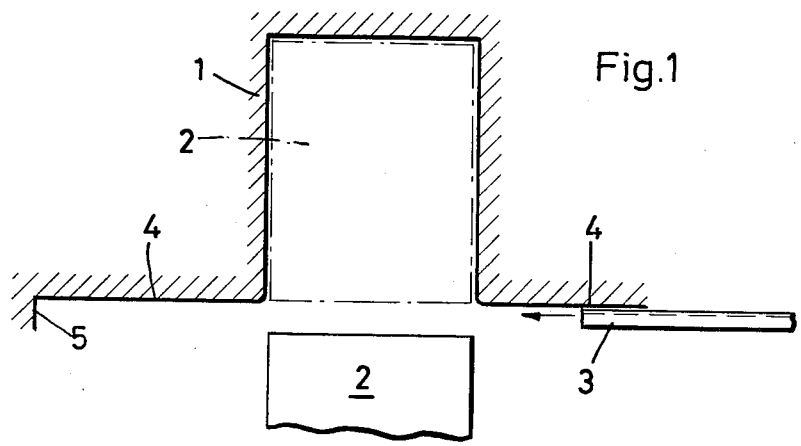
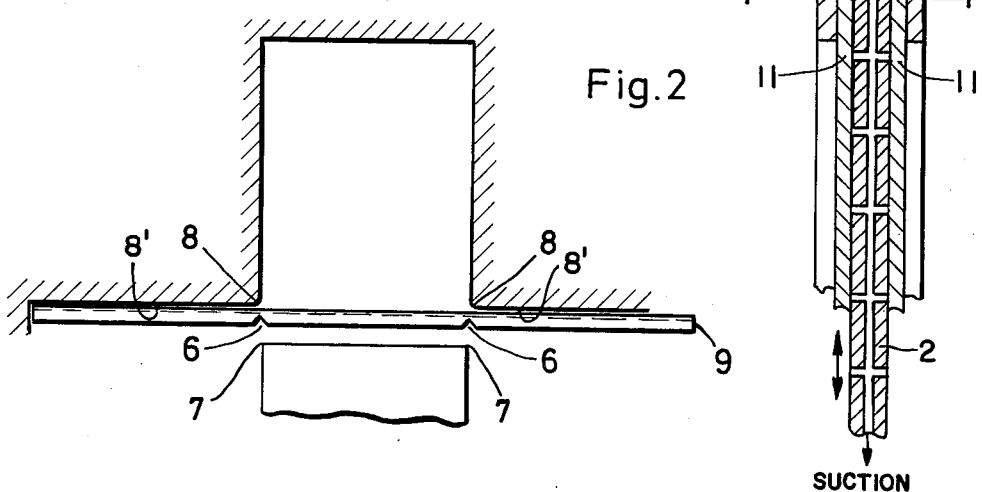
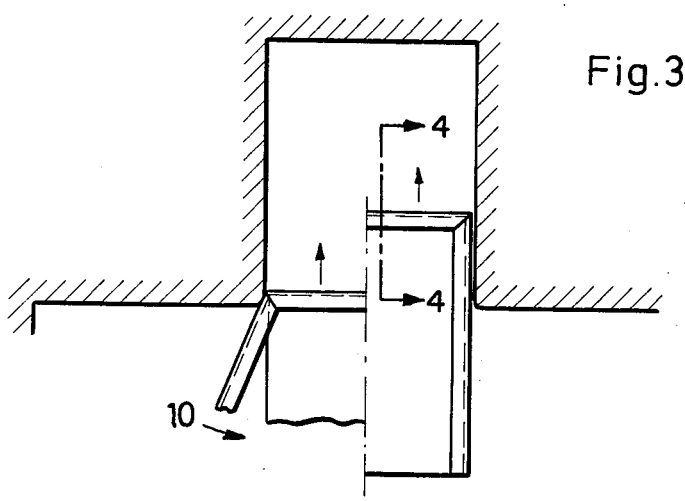

METHOD AND APPARATUS FOR PRODUCING ACCUMULATOR PLATE SEPARATOR POCKETS

The present invention relates to a method and apparatus for producing accumulator plate separator pockets.

For the purpose of separating plates of different polarity in accumulators, use is made of films of porous plastics material, which are formed in pairs as pockets, for the purpose of receiving a plate. The rectangular films which are all of the same size, are connected together along three edges by means of edge strips of plastics material which are U-shaped in cross-section and whose profile sides are welded or adhesively bonded to the edges of each film. Hitherto use has been made of edge strips of soft-elastic material whose sides, in the unstressed condition, are directed towards one another, that is to say inward. The intention is to thereby ensure that the edge strip can easily be clipped by hand on the edges of two films which are to be joined together and between which is situated an insertion plate which is subsequently removed and which determines the spacing of the films. The fitting of the edge strips on the films is laborious.

The problem underlying the invention is therefore that of providing a method and an apparatus which permit processing by machine.

The solution provided by the invention consists in that the edge strip, consisting of stiff material and cut to shape, is inserted between the films, which optionally are supported by an insertion plate, and two stops disposed a distance apart corresponding to the width of the film, whereupon the films are brought between the sides of the edge strip and, together with the latter, between the stops.

The starting point of the invention is the essential realization that machine processing is not possible with the relatively solft edge strip, shaped after the style of a spring clip, of the known type. The use of an edge strip of comparatively stiff material, whose profile sides must accordingly lie approximately parallel even in the unstressed state, is therefore important. Any substantial inclination of the profile sides would be acceptable at most if it were in the outward direction, since this would then be neutralized by pressing during the subsequent joining process (welding, press bonding).

When the films, which are preferably protected by an insertion plate, are pushed between the stops, the leading edge of the films first passes between the profile sides of the edge strip, which for this purpose must be disposed with its open side facing the films. The edge strip then strikes against the stops, which lie laterally slightly outside the corners of the films and thereby apply a bending action to the portions of the edge strip projecting beyond the corners of the film. Through this bending action the projecting ends of the edge strip fold around the corners of the films and bear against the side edges of the films, overlapping them by their profile sides, while the films are pushed through between the stops.

In an advantageous apparatus for applying this method there is provided for the insertion plate a movement guide which extends between the two stops, the distance between which corresponds to the width of the films provided with the edge strips. Furthermore, there is provided for the edge strip, which is cut to shape, a holder which holds the edge strip between the stops and the position of rest of the insertion plate (outside the stops) in the plane of movement of the insertion plate and with its open side facing the latter. The stops may be formed by the corners on the open side of a press frame into which the films together with the edge strip and the insertion plate can be inserted for the purpose of making the connection between the edge strip and the edges of the film. The press frame may therefore for example be a frame which surrounds the edge strip and the films in the welding apparatus.

The holder for the edge strip may be formed by a guide in which the edge strip can be inserted in its longitudinal direction, in the required position, between the stops and the position of rest of the insertion plate. The edge strips can be pushed by machine into a guide of this kind. It is obvious that the guide must be so shaped that it enables the film, the edge strips, and the insertion plate to move out of the position of rest into the press frame.

According to a preferred embodiment of the invention the guide may also be combined with punching devices which cut into or angularly cut out the profiled sides of the edge strip in the regions where it will subsequently be bent around the corners of the films. They may optionally also effect the cutting of the edge strip to length. When punching devices of this kind are provided, the edge strip can be processed entirely automatically from long pieces of edge strip or from strip coming direct from an extruder.

The invention is explained more fully below with reference to the drawing, which illustrates one advantageous embodiment.

FIGS. 1, 2 and 3 show a diagrammatical plan view of three different functional stages in carrying out the method of the invention.

FIG. 4 is an enlarged view in section taken substantially along line 4—4 of FIG. 3 showing a fragment of the pocket with the insertion plate partially moved toward its extended position.

A U-shaped part 1 is a so-called press frame, that is to say a three-sided outer holder or work cavity for a separator pocket, in a machine for joining the separator films 11 to the edge strip, this machine not being shown in the drawing. In the same plane as the press frame 1 an insertion plate 2 is slideable between retracted position of rest outside the press frame 1, this position being partly shown in solid lines, and a retracted position inside the press frame which is shown in dot-and-dash lines in FIG. 1. The width of the insertion plate 2 is narrower than the press frame 1 by slightly more than twice the thickness of the web of the edge strip.

Between the press frame 1 and the position of rest of the insertion plate 2, a guide indicated at 4 is provided for an edge strip 3. Its sole purpose is to locate the edge strip, which in FIG. 1 is shown as coming from the right, in the same plane as the press frame 1 and the insertion plate 2, in the position shown in FIG. 2 in which its open side faces the insertion plate 2. The films are held lying tightly against the opposite faces of the insertion plate 2 so that the latter together with the films can be inserted into the open side of the edge strip when moved as shown in the left hand portion of FIG. 3. The films may for example be held by suction means of known type as illustrated in FIG. 4 against the plate 2. Insertion into the edge strip 3 may also be facilitated by arranging for the profile sides of the strip to spread out slightly in the outward direction in the unstressed state. During the subsequent welding operation or press bonding of the sides of the edge strip to the films achieved by any known means and illustrated by pressure arrows P in FIG. 4, they then assume the desired parallel position.

The guide 4 has a abutment means which ensures the correct position of the edge strip 3 before movement of the plate 2.

The profile sides of the edge strip are mitred or notched at 6 in the immediate proximity of the corners of the films or of the insertion plate (a simple cut may alternatively be sufficient). In addition, it is cut to the desired length at 9. These cutting operations can be effected with the edge strip in the position shown in FIG. 2, but are expediently effected before the insertion of the edge strip 3 into the machine.

The cuts 6 are situated between the corners 7 of the insertion plate, which are slightly offset laterally, and the corners of the press frame 1. Consequently on the insertion of the insertion plate 2 into the press frame as shown in FIG. 3, (left), the edge strip 3 engages stop means such as end surface 8' of corners 8 of the press frame and on further insertion of the insertion plate into the press frame as shown in FIG. 3, (right), the strip 3 is applied against the side edges of the plate 2, its profile side gripping over that edge. The corners 8 of the press frame may be given a shape which facilitates this bending of the edge strip. They may for example be suitably rounded.

It can be seen that the edge strip 3 should be made of relatively stiff material in order to be able to be treated in the manner described. A softer consistency of the edge strip would impose more stringent requirements on the quality of the guides and is therefore usually less expedient. Nevertheless, the edge strip can be made of relatively thin material if for example polypropylene or hard polyvinyl chloride is used.

Not only does a relatively stiff edge strip provide the advantage that it can be processed by machine, but it also gives better support to the finished separator pocket. The pocket can be stacked and transported without risk of undesirable deformation. The films remain a defined distance apart even after storage for a long time, thus permitting simpler further processing of the pockets, if desired by machine.

What is claimed is:

1. A method of producing accumulator separator pockets wherein each pocket comprises two spaced rectangular films positioned in register and joined together on three sides by an elongated edge strip of U-shaped cross section comprising the steps of:
    guiding and positioning an elongated edge strip of U-shaped cross section across the entrance of a U-shaped work cavity with a center portion of said edge strip in register with said entrance and having a length slightly smaller than the width of said entrance, said edge strip further having end portions bearing against end surfaces of corners defining said entrance, and an opening in said edge strip facing away from said work cavity;
    positioning a pair of rectangular films in registering relation with the leading ends thereof in alignment with said center portion of said edge strip and facing said opening in said edge strip;
    inserting said leading ends of said films into said opening in said center portion of said edge strip; and
    moving said films and said center portion of said edge strip into said work cavity causing said end surfaces of said corners of said entrance to fold said end portions of said edge strip over corresponding sides of said films for producing a pocket.

2. The method according to claim 1 comprising the added step of supporting said films in parallel spaced-apart relation on opposite sides of an insertion plate for the inserting and moving steps.

3. The method according to claim 2 comprising the added step of bonding the sides of said edge strips to said films.

4. Apparatus for producing accumulator separator pockets comprising two spaced rectangular films positioned in register and joined together on three sides by an elongated edge strip of U-shaped cross section, the combination comprising:
    a press frame defining a substantially U-shaped work cavity in which an accumulator separator pocket is produced, said cavity having an entrance;
    stop means at said entrance of said cavity spaced apart a distance slightly greater than the width of a pair of spaced rectangular registering films;
    guide means adjacent said entrance of said cavity for guiding an elongated edge strip of U-shaped cross section across said entrance of said cavity with the opening in said U-shaped edge strip facing away from said cavity, and positioning said edge strip with a center portion thereof in alignment with said entrance and having a length slightly smaller than the width of said entrance, said edge strip further having end portions in alignment with said stop means; and
    film insertion means in alignment with said work cavity and receiprocally movable between a retracted position in which said film inserting means is facing said opening in said center portion of said edge strip and an extended position in which said leading ends of said films are initially inserted into said opening in said center portion of said edge strip and then said center portion and said films are inserted as a unit into said work cavity causing said end portions of said edge strip to engage said stop means which force said end portions over the sides of said films to produce a pocket.

5. The apparatus according to claim 4 wherein said center portion of said edge strip is provided with notches substantially at the ends of said center portion and spaced apart a distance substantially equal to the width of said films, said stop means comprise corners forming said entrance of said work cavity, and said film insertion means comprises a reciprocally movable insertion plate having means for supporting said films on opposite sides thereof.

6. The apparatus according to claim 5 wherein said supporting means comprises suction means.

* * * * *